UNITED STATES PATENT OFFICE 2,686,787

PROCESSES FOR PREPARING OXAZOLINES

Ronald Slack, Chelsea, Julius Nicholson Ashley, Upminster, and Samuel Sidney Berg, Shepherds Bush, England, assignors, by mesne assignments, to Parke, Davis & Company, Detroit, Mich., a corporation of Michigan No Drawing. Application December 8, 1950, Serial No. 199,939

Claims priority, application Great Britain August 9, 1950

6 Claims. (Cl. 260—307)

This invention relates to new chemical compounds and to processes for their preparation. In particular, it is concerned with the provision of a new and useful process for the preparation of oxazolines useful as therapeutic agents or as intermediates in the production of therapeutic agents.

In the specification of co-pending application No. 199,936 of even date herewith there are described new oxazolines of the formula:

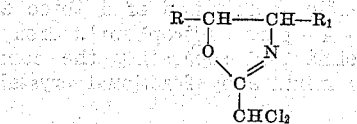   I where R represents a para-nitrophenyl group and $R_1$ represents an hydroxymethyl group or R represents a hydrogen atom and $R_1$ represents a para-nitrophenyl-hydroxymethyl group. In the aforesaid specification, it is explained that these compounds can be regarded as having either the structure:

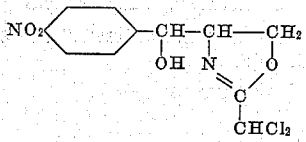   II or the analogous structure:

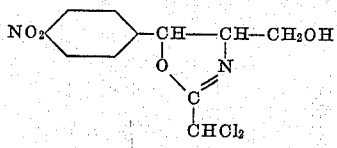   III and that since each compound contains two asymmetric carbon atoms it can exist in structural as well as optical isomeric forms. It is further explained that these structural isomeric forms, referred to as "erythro" and "threo" respectively, can exist as racemates or optically active isomers and, that accordingly each compound can exist in six different forms and that, finally, for a given structural formula of conventional type as used herein, there are included the complete mixture of all six forms, the racemates of the erythro and threo series and the four individual isomers L-erythro, D-erythro, L-threo and D-threo.

It is the object of the present invention to provide a new process for the preparation of the aforesaid oxazolines, especially the DL- and D-threo forms.

According to the present invention compounds of Formula I are prepared by reacting an amino-diol of the formula:

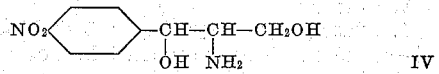   IV with an imino-thio-ether of the type:

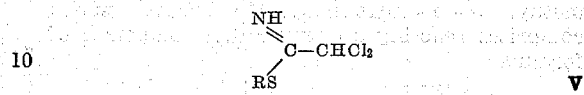   V (where R represents the residue of a mercaptan R.SH) which may be employed in the form of an acid addition salt. The resultant reaction mixture contains corresponding compounds of both types II and III which can be separated as, for example, by fractional crystallisation or chromatography.

The amino-diol starting material, of course, contains two asymmetric carbon atoms and can exist in erythro and threo forms each of which can occur as racemate or D or L isomers. In the process above described there is no substantial inversion of erythro to threo form, or vice versa. There is, however, a substantial difference between the erythro and threo series as to the relative proportions of isomers of type II and type III produced. In the threo series, the proportion is substantially 2:3 while in the erythro series the product is substantially entirely erythro compound of type II with a minor percentage of erythro compound of type III.

If pure D-threo isomer of formula III is required it is preferred to employ as the starting material pure D-threo amino-diol of formula IV since the oxazolines are somewhat unstable and are, therefore, difficult to resolve by conventional methods.

The present invention is illustrated by the following example.

Example 1.1 g. of DL-threo 2-amino-1-p-nitrophenylpropane 1:3-diol in 6.6 cc. of anhydrous pyridine was treated with 1.3 g. of dichloroacetimino ethyl thioether hydrochloride. The resulting solution was kept overnight at room temperature and then filtered. The solid was washed with a little anhydrous pyridine. The combined filtrate and washing was evaporated in vacuo to a reddish gum which was dissolved in 10 cc. of hot methanol. The crystalline solid which separated was recrystallised from methanol. It was DL-threo 2-dichloromethyl-4-p-nitrophenyl-hydroxymethyl-$\Delta^2$-oxazoline, M. P. 162–163° C.

The combined mother liquors were evaporated in vacuo to a gum which was solidified by rubbing with a little methyl alcohol. The solid so obtained was recrystallised from ethyl acetate to yield DL-threo 2-dichloromethyl-5-p-nitrophenyl - 4 - hydroxymethyl - $\Delta^2$ - oxazoline, M. P. 128–130° C.

The imino-thioether hydrochloride was prepared by the method disclosed in the specification of co-pending application No. 199,938.

In precisely analogous manner there can be obtained:

D-threo 2 - dichloromethyl-4-p-nitrophenylhydroxymethyl-$\Delta^2$-oxazoline, M. P. 143–144° C. and $(\alpha)_D^{20}=176.85°$ (C=1% in ethyl acetate).

D-threo 2 - dichloromethyl-5-p-nitrophenyl-4-hydroxymethyl-$\Delta^2$-oxazoline, M. P. 132–133° C. and $(\alpha)_D^{20}=-13.65°$ (C=6.5% in ethyl acetate).

Similarly, in place of the ethyl thioether hydrochloride the base itself can be employed as also can the homologues described in the specification of co-pending application No. 199,935.

We claim:

1. Process for preparing a 2-dichloromethyl-$\Delta^2$-oxazoline of the class consisting of 2-dichloromethyl - 4 - p-nitrophenylhydroxymethyl - $\Delta^2$ - oxazolines and 2 - dichloromethyl - 4 - hydroxymethyl - 5 - p - nitrophenyl-$\Delta^2$-oxazolines which comprises reacting an amino diol compound of formula

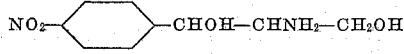

with an imino thio-ether compound of formula

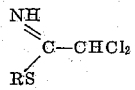

where R is lower alkyl.

2. Process according to claim 1 in which said amino diol compound is in the threo form and said imino thio-ether compound is in the form of its mineral acid addition salt and said compounds are reacted in an anhydrous solvent.

3. Process according to claim 1 in which the amino diol compound is in the B-threo form and said imino thio-ether compound is dichloro acid amino ethyl thio-ether chloride and said compounds are reacted in anhydrous pyridine at room temperature.

4. The process which comprises reacting a threo 2-amino-1-para-nitrophenylpropane 1:3-diol with a dichloracetiminoalkyl-thio-ether mineral acid salt to produce a reaction product consisting of a mixture of a threo 2-dichloromethyl - 5 - para - nitrophenyl - 4 - hydroxymethyl-$\Delta^2$-oxazoline and of a threo 2-dichloromethyl - 4 - para - nitrophenylhydroxymethyl-$\Delta^2$-oxazoline and separating the components of this mixture by fractional crystallisation.

5. The process which comprises reacting a threo 2 - amino-1-para-nitrophenylpropane 1:3-diol with a dichloroacetiminoalkyl-thio-ether hydrochloride to produce a reaction product consisting of a mixture of a threo 2-dichloromethyl-5-para-nitrophenyl - 4 - hydroxymethyl-$\Delta^2$-oxazoline and of a threo 2-dichloromethyl-4-para-nitrophenylhydroxymethyl - $\Delta^2$ - oxazoline and separating the components of this mixture by fractional crystallisation.

6. The process which comprises forming a solution of a threo 2-amino-1-para-nitrophenylpropane 1:3-diol in an organic solvent and admixing that solution with a dichloracetiminoalkyl-thio-ether mineral acid salt to produce a reaction product consisting of a mixture of a threo 2-dichloromethyl-5-para - nitrophenyl-4-hydroxymethyl-$\Delta^2$-oxazoline and of a threo 2-dichloromethyl - 4 - para - nitrophenylhydroxymethyl-$\Delta^2$-oxazoline and separating the components of this mixture by fractional crystallisation.

References Cited in the file of this patent

UNITED STATES PATENTS

| Number | Name | Date |
|---|---|---|
| 2,513,346 | Moersch et al. | July 4, 1950 |
| 2,562,114 | Moersch et al. | July 24, 1951 |

OTHER REFERENCES

Wiley et al., "Chem. Reviews," June 1949, vol. 44, pp. 455, 456.